Figures 1, 2:
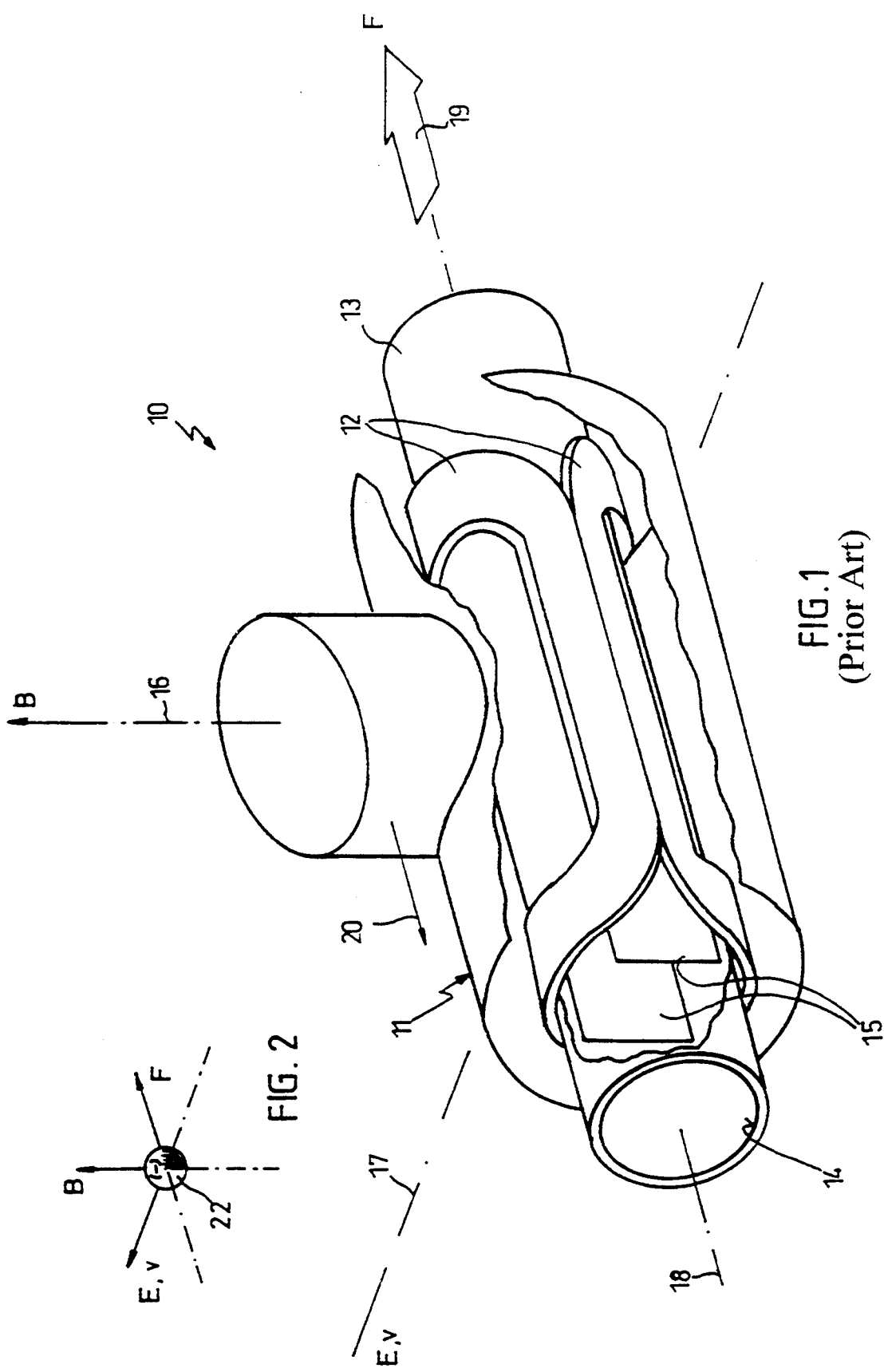

United States Patent [19]
Laukien et al.

[11] Patent Number: 5,352,139
[45] Date of Patent: Oct. 4, 1994

[54] METHOD AND APPARATUS FOR THE PROPULSION OF WATER VEHICLES

[75] Inventors: Gunther Laukien, Silberstreifen, D-7512 Rheinstetten-Forchheim; Arne Kasten, Karlsruhe; Michael Westphal, Offenbach, all of Fed. Rep. of Germany

[73] Assignee: Gunther Laukien, Fed. Rep. of Germany

[21] Appl. No.: 646,613

[22] PCT Filed: May 23, 1990

[86] PCT No.: PCT/DE90/00379

§ 371 Date: Jan. 23, 1991

§ 102(e) Date: Jan. 23, 1991

[87] PCT Pub. No.: WO90/14265

PCT Pub. Date: Nov. 29, 1990

[30] Foreign Application Priority Data

May 24, 1989 [DE] Fed. Rep. of Germany ....... 3916882
Oct. 3, 1989 [DE] Fed. Rep. of Germany ....... 3932918

[51] Int. Cl.$^5$ .................................................. B60L 11/02
[52] U.S. Cl. ........................................ 440/6; 417/50; 60/202; 310/11
[58] Field of Search ................ 440/6; 417/50; 60/202; 310/11

[56] References Cited

U.S. PATENT DOCUMENTS

| | | | |
|---|---|---|---|
| 2,905,089 | 9/1959 | Blake | 103/1 |
| 3,030,888 | 4/1962 | Keltz | 103/1 |
| 3,662,554 | 5/1972 | De Broqueville | 60/202 |
| 4,514,653 | 4/1985 | Batni | 310/178 |
| 4,831,297 | 5/1989 | Taylor et al. | 440/6 |

FOREIGN PATENT DOCUMENTS

| | | |
|---|---|---|
| 858212 | 6/1942 | Fed. Rep. of Germany . |
| 888515 | 6/1951 | Fed. Rep. of Germany . |
| 873362 | 11/1951 | Fed. Rep. of Germany . |
| 2052605 | 10/1970 | Fed. Rep. of Germany . |
| 2529471 | 7/1975 | Fed. Rep. of Germany . |
| 3518883 | 5/1985 | Fed. Rep. of Germany . |
| 2112791 | 11/1970 | France . |
| 70294 | 3/1989 | Japan ........................... 440/6 |
| 494672 | 7/1968 | Switzerland . |

OTHER PUBLICATIONS

British Journal "Maritime Defence, the Journal of International Navel Technology"–Japan furthers electro–magnetic propulsion research, Dec. 1988, p. 445.
Book of Becker/Sauter "Theorie der Elektrizität", 19. Edition, 1969, vol. I, pp. 255 to 266.
Book of Pohl "Einführung in die Physik", 20. Edition, 1967, vol. II, Elekrizitätslehre, pp. 69 and 98 to 104.
Book of R. Geissler "Der Schraubenpropeller" Dissertation TU Berlin, Springer 1918, pp. 4, 5, 16 and 17.
German Journal "Schiff und Hafen" 1989, No. 9/10, pp. 681 tp 684.
Lecture Manuscript of Intichar, L., Erlangen, with the title "Supraleitende Maschinen", Seminar Supraleitungstechnik on May 13 and 14, 1985 in the School for Nu- (List continued on next page.)

*Primary Examiner*—Jesus D. Sotelo
*Attorney, Agent, or Firm*—Claude A. S. Hamrick

[57] ABSTRACT

An apparatus is disclosed for the propulsion of water vehicles. A magnet field as well as an electric field with essentially perpendicular field lines are produced in a pipe through which surrounding water flows. In this manner, a force is exercised upon charge carriers within the surrounding water and this force is used as a propulsion force for the water vehicle. The pipe is surrounded by a solenoid coil which is arranged essentially coaxially to the pipe. A first electrode is arranged essentially along the axis of the pipe and a voltage source is switched between the electrode and the pipe, acting as a second electrode. An Archimedes' screw is arranged in the cylindrical gap between the electrode and the pipe in order to deflect the surrounding water circulating about the axis into an axial direction, or the screw is rotationally rigidly connected to a moving conductor arranged perpendicularly to the direction of the magnet field.

17 Claims, 9 Drawing Sheets

OTHER PUBLICATIONS clear Technology of the Nuclear Research Center Karlsruhe, Germany.

German book of Müller/Fricker/Frohne/Vaske "Grundlagen der Elektrotechnik", B. G. Teubner, Stuttgart, 1986, pp. 187 to 191, FIG. 4.43.

German book of Flegler "Grundgebiete der Elektrotechnik", p. 219.

British Journal "The Motor Ship", Oct. 1988, p. 14 Japan pushing forward with electromagnetic propulsion.

British Journal "Marine Propulsion", Jul./Aug. 1989, p. 40 "Jastram's Electric Propeller".

Transactions of the North East Coast Institution of Engineers and Shipbuilders, vol. 92, No. 5, May 1976, The North East Coast Institution of Engineers and Shipbuilders, (Newcastle upon Tyne, GB), A. D. Appleton: "The role of superconducting D.C. machine for marine propulsion systems", pp. 111–122.

METHOD AND APPARATUS FOR THE PROPULSION OF WATER VEHICLES

The invention concerns an apparatus for the propulsion of water vehicles with which a magnetic coil surrounds a pipe through which surrounding water is streaming and in the pipe at least one first electrode connected to a voltage source is arranged.

A method and an apparatus of the above mentioned kind are known in the art from the British Journal "Maritime Defence, the Journal of International Naval Technology", 12/1988, Page 445.

It is known in the art of so called magnetic hydrodynamic propulsion that an electric as well as a magnetic field are superimposed upon a medium which contains movable charge carriers. As a consequence of the action of the electric field, the charge carriers begin to move and then in consequence of this motion of the charge carriers in the magnetic field the so called Lorentz force is exerted on the charge carriers, this force being given by the cross product of the magnetic field and velocity vectors in a manner which is known in the art.

As mentioned above, the application of this type of magnetic hydrodynamic propulsion to water vehicles is also known in the art. In the above mentioned configuration which is known in the art, the pipe is surrounded by two superconducting saddle coils which are arranged symmetrically about the pipe axis. The saddle coils produce, in this manner, a magnetic field whose direction is perpendicular to the pipe axis. In the pipe, two condensor like plate electrodes are arranged in an axial direction so that the magnetic field produced by these plate electrodes likewise runs perpendicular to the direction of the axis and also perpendicular to the direction of the magnetic field. This has the consequence that the free charge carriers of the surrounding water which are located in the pipe, principally salt water ions, are acted on by a Lorentz force which runs in the axial direction of the pipe. In this way, the arrangement which is known in the art produces a recoil force which stems from the charge carriers which are moving axially in the pipe. For the propulsion of a water vehicle in the apparatus known in the art, the saddle coils produce a magnetic field strength of two Tesla using a current of 2,000 Amperes which is supposed to lead to a recoil force of 8 KN.

The underlying physical principals necessary for understanding this type of magnetic hydrodynamic propulsion are described in the text book of Becker/Sauter "Theorie der Elektrizität", 19. Edition, 1969, Vol. I, Pages 255 to 266, as well as in the text book of Pohl "Einführung in die Physik", 20. Edition, 1967, Vol II, "Elektrizitätslehre" pages 98 through 104.

The procedure and the apparatus which is known in the art has the advantage that the propulsion unit does not, in any way, need moving elements and, therefore, practically no propulsion noise is produced. For this reason, this type of configuration is well suited for military applications, in particular, for the propulsion of submarines.

However, the apparatus and procedure which are known in the art have the disadvantage that the efficiency is relatively low and the construction of the coil is relatively complicated. A further disadvantage of the configuration known in the art is that, as a result of the use of saddle coils, a very large stray field is produced so that vehicles which are configured with the propulsion apparatus known in the art are easily detected by means of magnetic detection methods. Furthermore equipment which is located on board the water vehicle, in particular electronic equipment, is perturbed by the stray field of the magnet coil.

Propeller screws which can be configured in the form of Archimedes' spirals are known in the art from the DE-book R. Geissler "Der Schraubenpropeller", Dissertation TU Berlin, Springer 1918, page 4/5,16/17.

A propulsion mechanism for water vehicles with which the propulsion is effected by means a propeller in a tunnel-like guide running approximately in a direction along the vehicle is known in the art from the patent text DE-PS 873362. The tunnel-like guide can thereby exhibit the shape of a pipe which is tapered in the downstream direction.

Known in the art from the patent text DE-PS 888515 is a high-speed ship (Schnellschiff) which is configured as a hydrofoil. In this high-speed ship, the drive propeller is arranged at a distance from the hull in particular at the lower end of the stilts upon which the hull of the high-speed ship is lifted above the surface of the water at high speeds.

A motor boat with propeller drive is known in the art from the patent text CH-PS 494672 in which a propeller works within a water-directing pipe running from the bow to the stern lengthwise along the boat.

A hydrofoil consisting of a hull with glide elements is known in the art from DE-OS 3518 883. In this hydrofoil at least one hydrojet serves as a propulsion element.

A ship propeller seal is known in the art from DE-PS 858212. Thereby, the ship propellers are equipped with adjustable blades.

Known in the art from the German Journal "Schiff und Hafen" 1989, No. 9/10, pages 681 through 684 are high-power motors for ship propulsion with which magnetic hydrodynamic propulsion is also used. The utilization of superconducting magnets has also been proposed within this context. The use of new superconductors which are superconducting already at temperatures of minus 200 degrees C. has also been proposed in this context.

Furthermore, providing for a side water inlet to a doubly open-sided water-driven jet-pipe in water propulsion assemblies is known in the art from DE-OS 20 52 605.

The use of a motor to drive a hydrodynamic propulsion element, for example a propeller, is, furthermore, generally known in the art of ship construction. In this context, the use of a unipolar motor to propel a ship wherein a current-carrying conductor is moved through a magnetic field produced from a magnetic coil the field lines of which are always largely at right angles to the direction of the current is known in the art.

An apparatus of the above mentioned kind is known in the art from the lecture manuscipt of Intichar, L., Erlangen, with the title "Supraleitende Maschinen" which was delivered on the occasion of a lecture which took place within the context of a seminar "Supraleitungstechnik" on 13 and 14 May 1985 in the School for Nuclear Technology of the Nuclear Research Center Karlsruhe.

In the apparatus which is known in the art, a mechanical propulsion is provided for on board a surface vessel consisting of two medium speed Diesel motors. The Diesel motors mechanically drive two superconducting generators which, in turn, electrically drive a superconducting unipolar motor. In turn, the superconducting unipolar motor drives, in a conventional manner via a shaft, a conventional ship propeller. For the superconducting motor the use of either a disk type unipolar motor with homogeneous axially directed magnetic field or a drum type unipolar motor with radially directed magnetic field were hereby alternatively proposed.

In the apparatus known in the art which is apparently envisioned for civilian application areas with surface vessels, a substantial potential advantage of unipolar motors is not taken advantage of, namely that a unipolar motor, in principal, only exhibits one single moving part, namely the moving conductor with the rotationally connected drive element which, in turn, produces the necessary propulsion force. Moreover, in the apparatus which is known in the art, a complicated arrangement with Diesel motors, superconducting generator, and superconducting unipolar motor is utilized which not only requires substantial effort, but moreover in consequence of the plurality of periodically alternating moving parts i.e. the Diesel motor cylinders, produces a large amount of noise.

The apparatus which is known in the art is therefore only suitable for the civilian applications mentioned.

Unipolar motors are for example known in the art from the German book "Müller/Fricker/Frohne/-Vaske, Grundlagen der Elektrotechnik, B. G. Teubner, Stuttgart, 1986, Pages 187 through 191 in particular FIG. 4.43. Unipolar motors are known in the art from the text book of Pohl "Einführung in die Physik", 20. Edition, 1967, Vol. II "Elektrizitätslehre", pages 69 and 101 as well as from the text book of Flegler, "Grundgebiete der Elektrotechnik", page 219.

Thereby, in contrast, the underlying purpose of the invention is to further improve a procedure and an apparatus of the above mentioned kind such that, using a more compact construction, the efficiency is increased.

This purpose is achieved in accordance with the above mentioned method in that within the pipe an axially directed magnetic field as well as a radially directed electrical field between an axis of the pipe and the pipe is produced and that surrounding water running around the axis is diverted in an axial direction.

The underlying purpose of the invention is achieved in accordance with the above mentioned apparatus in that the magnetic coil is configured as a solenoid coil and is arranged essentially coaxially to the pipe, in that the first electrode is arranged essentially at the axis of the pipe, in that the pipe is used as the second electrode, and in that a hydrodynamic propulsion element is arranged in the intermediate space between the first electrode and the pipe with directing elements which are at an angle with respect to the radial direction.

The underlying purpose of the invention is in this manner completely achieved.

Solenoid coils have, in contrast to saddle coils, a significantly larger efficiency since the magnetic field produced by the solenoid coils is completely enclosed by the coil itself and the stray field of such a coil is very small. Furthermore a solenoid coil is, by way of example, substantially simpler to construct than a pair of saddle coils whereby the individual coil shapes and thereby that of the support structure as well require great effort. It is particularly advantageous that the hydrodynamic propulsion element with the directing elements is arranged within the solenoid coil. This configuration is substantially more compact than the conventional configuration wherein the propulsion motor and the propeller are arranged in a row, one behind the other.

In general, it is therefore possible using the invention to effect propulsion units with a substantially simpler and more compact construction with which the energy used is transformed in a very efficient manner into water vehicle propulsion power.

For these reasons the procedure according to the invention as well as the apparatus according to the invention are particularly well suited for the propulsion of submarines be it for the production of a forward cruise drive or of a crawl drive (Schleichfahrt), be it for the production of propulsion power to change depth.

It is particularly preferred when the pipe for the production of a radially directed electrical field functions as an opposing electrode to the first electrode and when the directing elements can be rigidly coupled to the pipe in such a way that a force is directed upon the charge carriers in the surrounding water and this force is utilized as the propulsion force for the water vehicle.

This measure has the advantage that within the context of the present invention a MHD propulsion can be applicable as was already described above as being, in and of itself, known in the art. These types of MHD propulsions have the particular advantage that they include no moving parts so that a particularly noise-free drive is possible as is precisely desired in the military field.

In other preferred embodiments of the invention an ionisation unit is connected to the pipe, by way of example, a substance is added to the surrounding water to increase its conductivity.

This measure has the advantage that by increasing the concentration of ions, the propulsion force is increased. Clearly, in this event, the ionisation unit can also be introduced for a brief period of time in order, by way of example, to temporarily increase the propulsion force of a military water vehicle during an attack or a retreat.

In further embodiments of the invention the directing elements are rotatably supported and are connectable to a propulsion motor.

This measure also has the advantage that the propulsion force, be it for constant or temporary operation, can be increased when the directing elements are turned in opposition to the force of charge carriers which is acting upon them.

Furthermore embodiments of the invention are preferred in which the force acting on the charge carriers is adjustable as a function of the radial distance from the electrodes, by way of example, in that the dependence of the electrical field strength or the pitch angle of the directing elements can be varied as a function of the radial distance from the electrode.

This measure has the advantage that the natural dependence of the field strength on the radius associated with the cylindrical condenser configuration in accordance with the invention can be compensated for in order to avoid turbulence and cavitation resulting from varying Lorentz forces.

In further preferred embodiments of the invention electrodes are arranged in the stray field of the magnet coil.

This measure has the advantage that the magnetic field emanating from the coil is also used for propulsion. In this case, in a particularly advantageous manner, one takes advantage of the fact that, on the one hand, the field lines of the stray field are contained in a plane wherein the drive direction axis also lies but, on the other hand, the field lines are essentially perpendicular to the drive direction. One can, therefore, arrange the additional electrodes parallel to the plane mentioned so that the resulting propelling force lies exactly in the drive direction of the water vehicle. This configuration of the electrodes is from the point of view of flow technology particularly advantageous because electrodes formed in this manner have only a negligibly small flow resistance.

In a further particularly preferred group of embodiments of the invention the pipe has an enlarged cross section in the direction of flow of the water.

This measure has the advantage that, for constant throughput, the flow velocity at the output of the pipe can be adjusted to be small so that, in this manner, turbulances at the exit of the pipe can also be substantially avoided.

Particularly preferred in this embodiment is when the pipe is equipped with a side intake opening.

This measure has namely the advantage that the force or acceleration acting on the water molecules along the axial length of the pipe is also distributed upon "fresh" water so that a particularly even distribution of the force acting on the water molecule is achieved along the axis.

A further group of embodiments are characterized in that the hydrodynamic propulsion element is driven by a unipolar motor with which a current carrying conductor is moved through a magnetic field produced from the magnetic coil the field lines of which are always essentially at right angles to the direction of current flow whereby, furthermore, on the one hand the conductor is preferentially electrically connected to a first feed conductor running within a shaft of the hydrodynamic propulsion element and on the other hand to a second feed conductor running along the pipe.

These measures have the advantage that the necessary drive force is produced through the use of a configuration which is exclusively configured in the manner of a unipolar motor with only one moving part namely with the moving conductor and the integrally connected propulsion element. Therefore, neither propulsion elements with periodically alternating linear moving machine elements nor the usual complicated direct current propulsion structures which are, by way of example used in submarines, are necessary. The apparatus in accordance with the invention has moreover an extremely simple structure and is very well suited therefore for use in maritime applications.

These measures have the further significant advantage that the propeller and the electrical conductor are combined with another into one unit so that the electrical conductor exhibits no hydrodynamic effects. Hereby one takes advantage in a advantageous manner of the fact that a propeller as hydrodynamic propulsion element, is well suited to accept radially or axially configured electrical connections.

The use of a solenoid coil as the magnet coil is also preferred in this embodiment of the invention.

This measure has the advantage that a particularly simple coil configuration can be applied which, as a construction element is hydrodynamically advantageous, simple to wind, and easily obtainable in superconducting form.

The propeller is preferably multi-staged and arranged coaxially to the solenoid coil.

In this manner a compact hydrodynamically advantageous propulsion unit with desireable or, using well-known means, optimizable propulsion properties is achieved which can be implemented in a manifold-like fashion in surface vessels as well as in submarines.

In a group of embodiments of the invention the conductor runs largely radially to an axis of the propeller.

Consequently, in this group of embodiments one makes advantageous use of uniform axially directed magnetic fields which can be produced with differing coil configurations.

It is particularly preferred in the above mentioned embodiment when the pipe and the propeller are connected to each other in a rotationably rigid manner and when the pipe is electrically connected via a first slip contact to a spatially fixed voltage source.

These measures have the advantage that the current can be fed into and removed from the electrical conductor in a simple fashion.

In a corresponding manner, a propeller shaft can also be connected in a rotationally rigid manner to the propeller whereby said propeller shaft is electrically connected via a second slip contact to a spatially fixed voltage source.

With these measures differing kinematic variations with respect to the spatially fixed reference system of the propulsion configuration and of the electrical connections among the shaft, the propeller and the pipe can be realized.

In a further group of embodiments of the invention the conductor runs essentially parallel to an axis of the hydrodynamic propulsion element.

This group of embodiments is therefore applicable in an advantageous fashion in magnetic fields wherein the magnetic field lines run uniformly in a radial direction with respect to a common axis.

In the above described embodiment the conductor runs preferably through a region of the magnetic field outside of the solenoid coil in which the magnetic field lines are directed essentially radially to the axis of the hydrodynamic propulsion element.

Thereby, with these measures, the desirable properties of solenoid coils already mentioned in detail above can also be taken advantage of with the present group of embodiments.

It is furthermore particularly preferred when two solenoid coils are arranged on a common axis and are axially separated from each other and when the conductor runs axially within the intermediate space between the solenoid coils.

This measure has the advantage that the radially directed magnetic field extruding between the solenoid coils leads to a doubled torgue and that the field for sufficiently close axial separations of the two solenoid coils can also be concentrated in an axially short spatial region where it also extends radially with sufficient homogeneity.

Thereby, advantageously, the propeller is rotationally rigidly connectable to a solenoid coil and a radially directed electrical field is produceable in the spatial region enclosed by the solenoid coil.

These measures have the advantage that, for particular operation modes of the water vehicle, it is possible to switch to a MHD propulsion which, in turn, is free of mechanical noise. Towards this end the propeller is stopped and by means of the radially directed electrical field in combination with the axially directed magnetic field, a circular motion around the axis of the propeller is induced upon the surrounding water in the region of the propeller. Since the propeller exhibits a directing surface which is adjusted with respect to the axis, the circularly circulating surrounding water is deflected in an axial direction and produces, in this manner, a recoil force.

Using the measures explained above it is possible to equip a water vehicle with a propulsion system which works in non-sensitive applications in the manner of a unipolar motor, i.e. with some small amount of noise, whereas in sensitive applications, for example in a submarine crawl-drive (Schleichfahrt), is switched to MHD propulsion.

It is particularly preferred with the invention when, as in prior art, a superconducting coil is used as the magnet coil since the propulsion force, in both unipolar propulsion with its accompanying rotating element as well as in MHD propulsion, the propulsion force depends directly on the magnetic field strength.

In a preferred embodiment of the apparatus according to the invention the directing elements are configured as screws, in particular, in the form of an Archimedes' spiral.

This measure has the advantage that the surrounding water circulating around the central electrode is deflected in a particularly effective manner in an axial direction so that a maximal forward force is produced.

In preferred embodiments of the invention, the pitch angle of the directing elements is adjustable. This, alternatively or conjointly, can transpire in that the adjustment angle is adjusted in the radial or axial directions.

In this manner it is possible to achieve optimal transformation of the circulating water motion into an axial push either in its own right and/or while taking into consideration the current flow conditions. When the directing elements are appropriately configured at the entrance and/or the exit end of the pipe, then it is, in a further advantageous manner, possible to transform the axial flow direction at the pipe entrance into a circulating current flow direction within the pipe without inducing substantial eddy currents and, at the exit end of the pipe, to produce a largely laminar axial current flow. This minimization of turbulances at the entrance and exit of the pipe has the advantage that, on the one hand, the efficiency of the configuration is increased and, furthermore, that the detectability of the water vehicle, in particular in the case of an underwater vehicle, is also reduced.

In a further preferred embodiment of the apparatus according to the invention, the voltage source is adjustable with regard to its output voltage and polarity.

This measure has the advantage that the forward force and forward direction are freely adjustable so that the water vehicle can be adjusted with regard to its speed and direction in an extremely simple manner.

It is particularly preferred with the invention, as in prior art, when a superconducting coil is utilized as the magnet coil because, as a consequence of the natural ion concentration in salt water, large field strengths are necessary in order to produce the forward force which is required for the propulsion of a real water vehicle.

In this regard it is particularly preferred if the coil is composed of high temperature superconductor.

This measure has the advantage that, depending on the transition temperature of the superconductor, only relatively simple cooling devices or even no cooling devices whatsoever are necessary if the coil is wound from a superconducting material which is already in a superconducting state at the surrounding temperature of the water vehicle.

With the invention, a multitude of variations are conceivable in order to arrange an apparatus in accordance with the invention in or on a hull of a surface or underwater vessel.

In this manner it is envisioned in a first variation that the propulsion unit is integrated into a ship's hull while, alternatively, it is also possible that the propulsion unit is configured on an extension at a separation from a ship's hull or that it is integrated into a keel of the ship's hull depending on what is reasonable in particular applications when taking into consideration the intended specific uses of said water vehicle.

If the propulsing unit according to a further embodiment of the invention is tilted with respect to the drive direction of a ship's hull, preferably in a swivellable manner, then, in an underwater vehicle, a maneuver to raise or lower the diving depth can be instituted whereas in a surface vessel through lifting (levitation) of the ship's hull, the hydrodynamic resistance can be reduced as is known in the art of hydrofoils.

It is particularly preferred according to the invention when a plurality of propulsion units made from solenoid coil and pipe are arranged onto a common frame in such a way that the total magnetic dipole moment is essentially zero.

It is particularly preferred in this case when two propulsion units made from solenoid coil and pipe are arranged parallel to each other on a common frame and when the magnetic fields produced by the solenoid coils are directed opposite to each other. It is thereby necessary that either the directing elements be pitched in a common direction and the electric fields in opposite directions or that the directing elements be pitched in opposing directions and the electric fields in a common direction.

In both cases the forward force of both propulsion units is caused to be commonly directed while, on the other hand, the parallel configuration of the propulsion elements has the advantage that the solenoid coil stray fields close in upon each other and therefore are further reduced. Whereas the variation with the directing elements pitched in a common direction has the advantage that mechanically identical propulsion units can be used, the variation with the oppositely pitched directing elements has the advantage that the entire propulsion system is free, to an even greater extent, of roll moments acting on the ship's hull.

Clearly however, in such a tandem configuration, both individual propulsion units can also be adjusted in differing manners, by way of example, in that one adjusts the voltage amplitude and/or polarity differently. In this manner,- maneuvering is therefore possible when the magnitude and/or direction of propulsion forces of the two individual propulsion units are different.

Finally embodiments of the invention are particularly preferred in which the magnet coil is surrounded by a shield casing.

This measure has the advantage that, on the one hand, the magnetically sensitive equipment located on board the underwater vehicle is protected to a large extent; furthermore there is the advantage that the water vehicle is difficult to detect using magnetic methods, and, finally, the efficiency of the magnet coil is also increased.

Further advantages can be derived from the description and the accompanying drawing. Clearly the above mentioned features and those explained below are applicable not only in the corresponding combination given but also in other combinations or alone without departing from the framework of the present invention.

Figure 3:
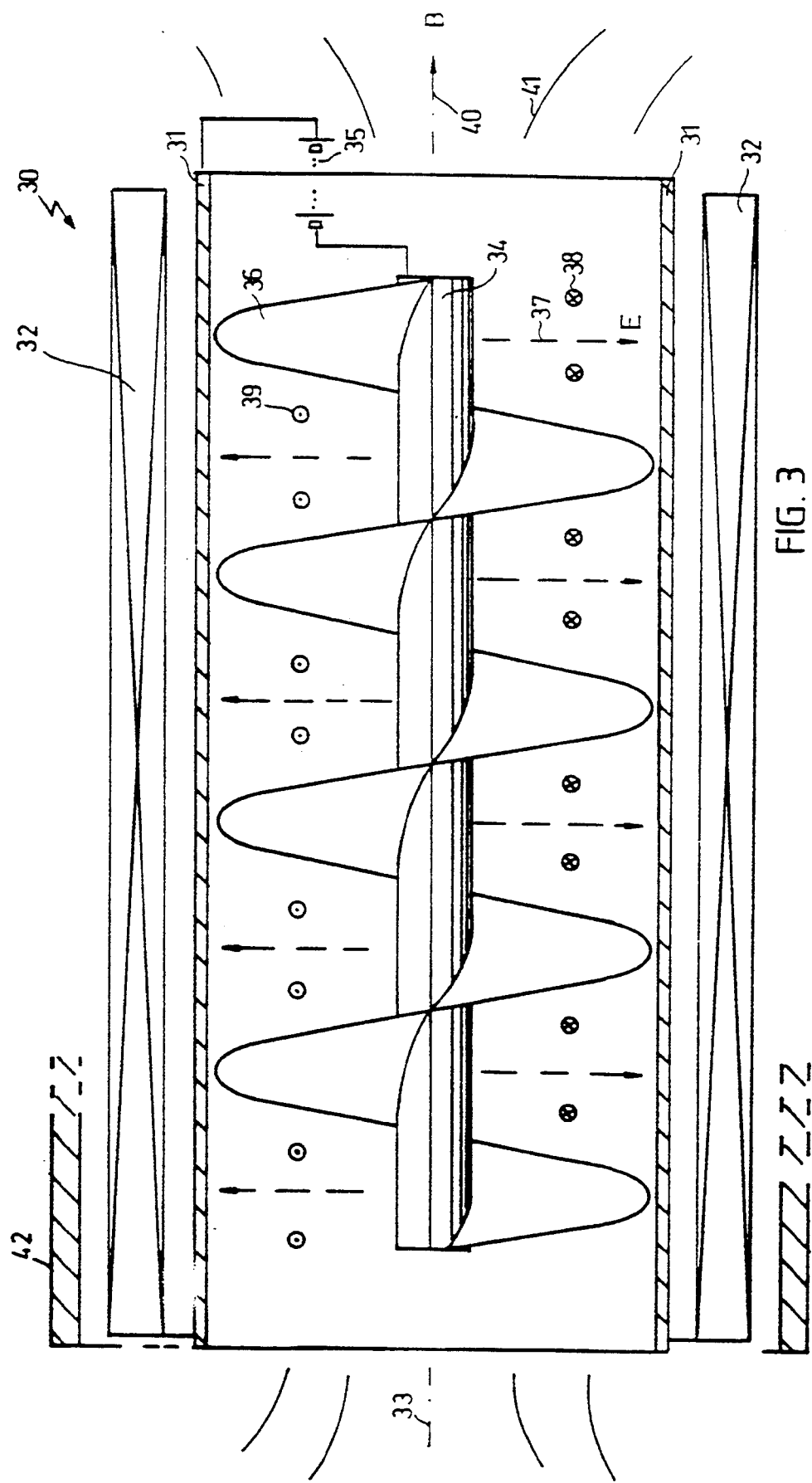
Figure 4:
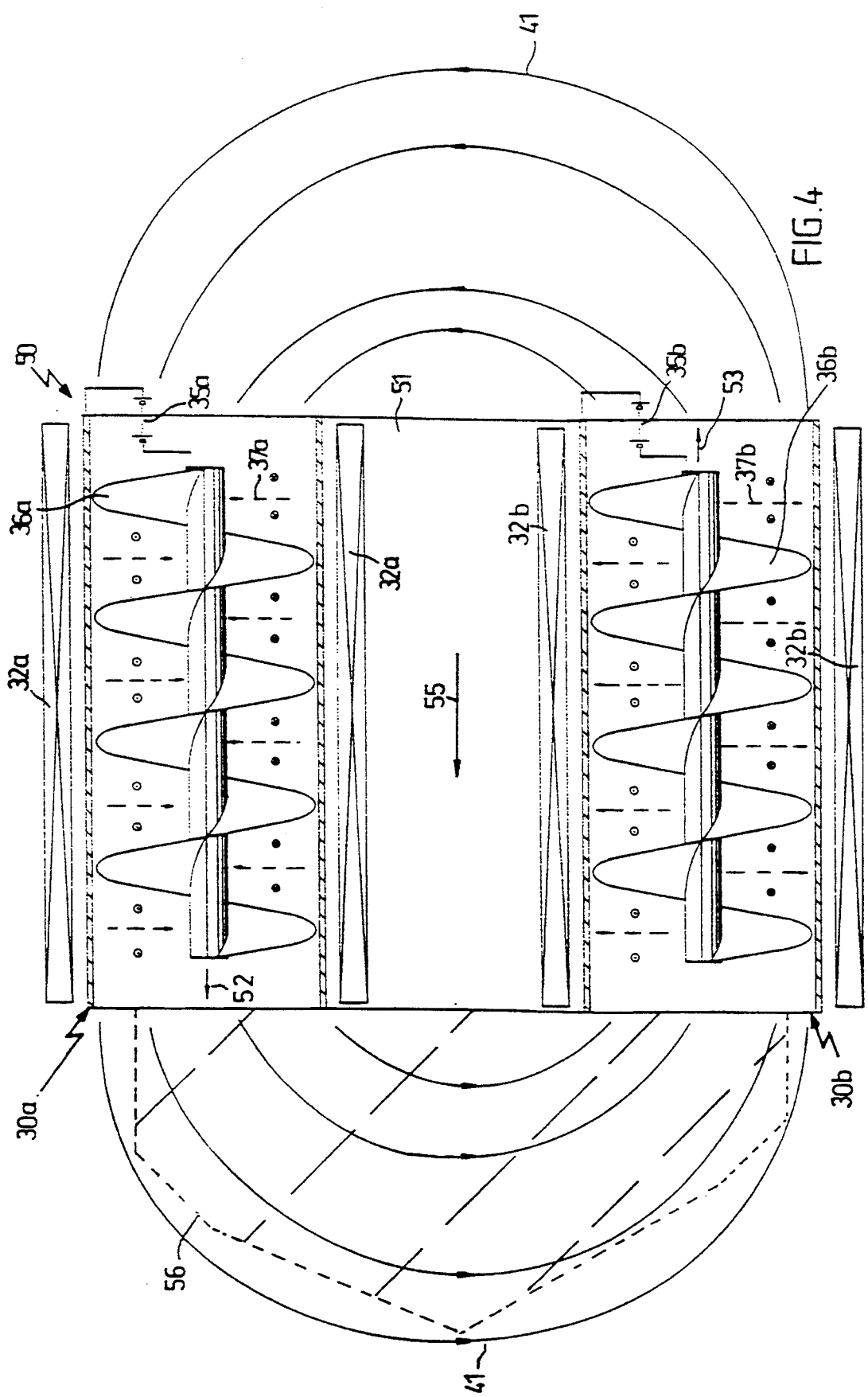
Figure 9:
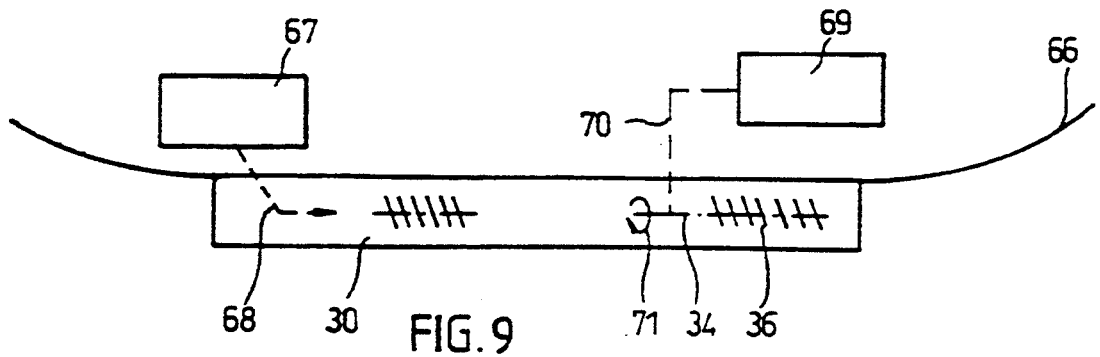
Figure 10:
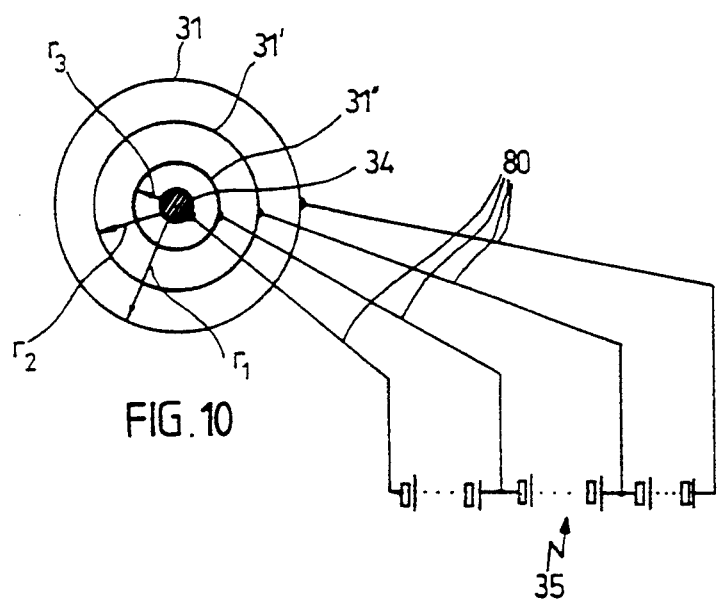
Figure 11:
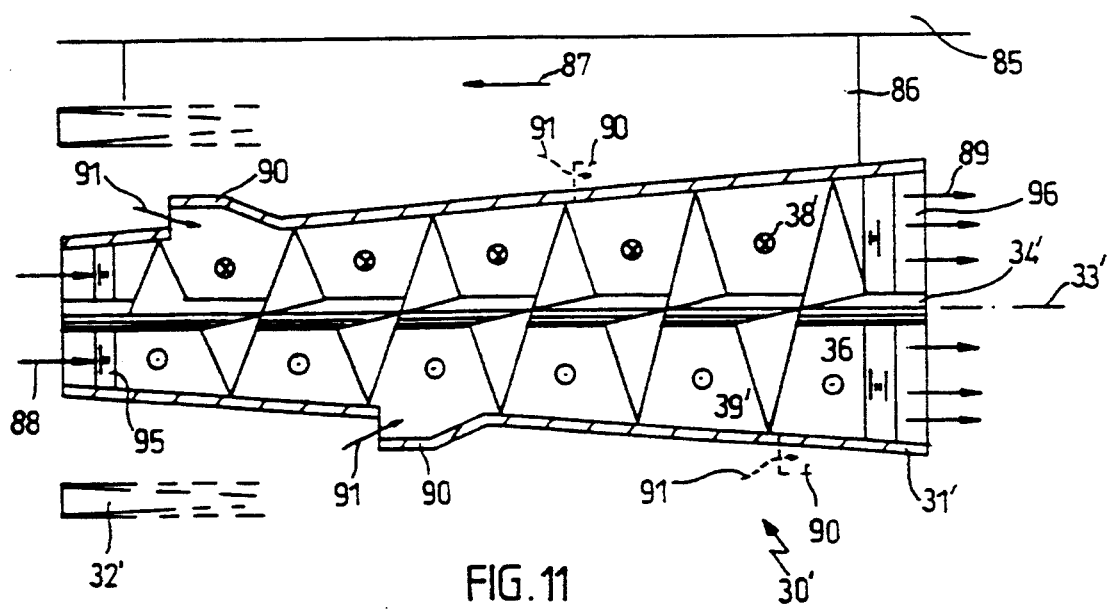
Figure 12:
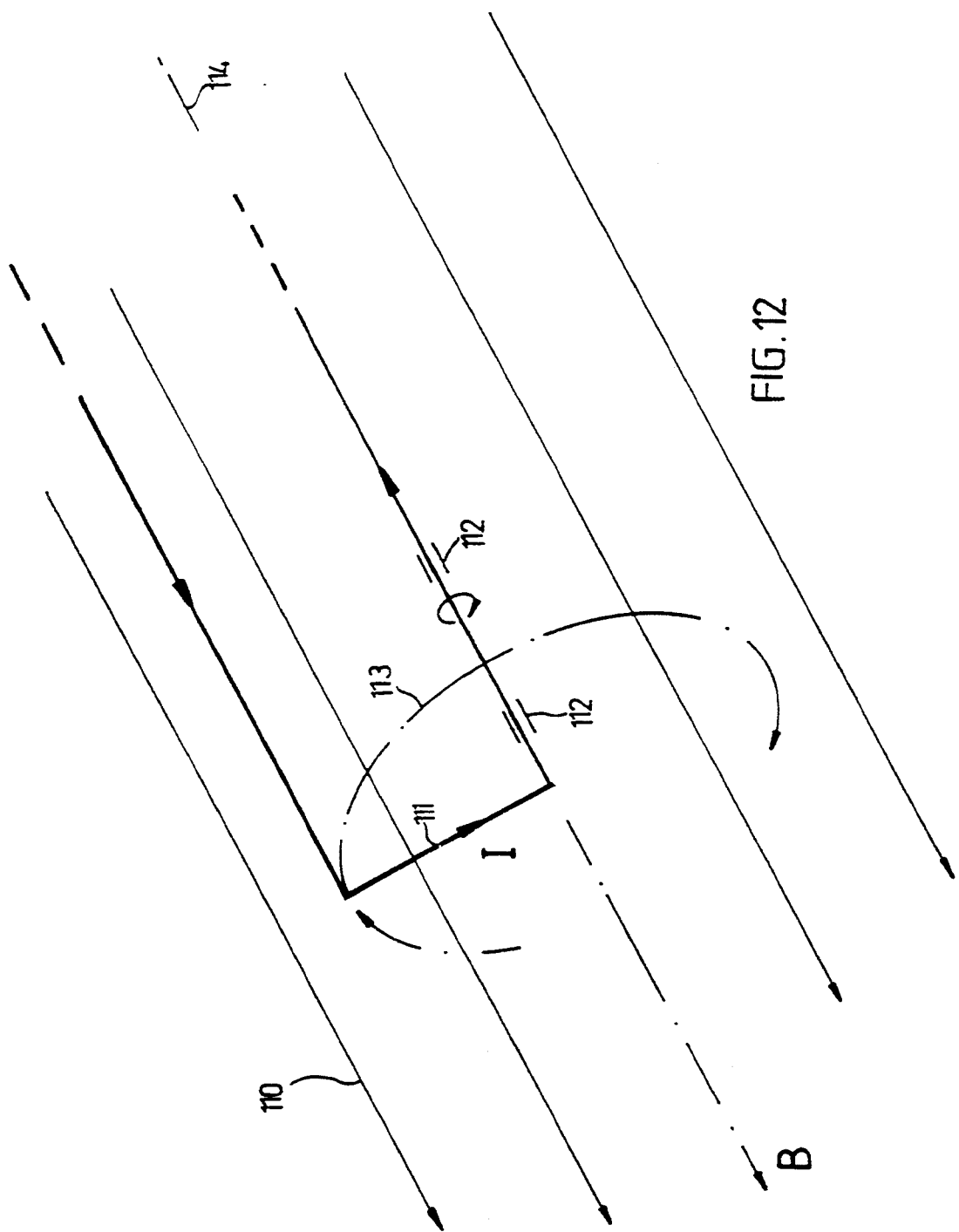
Figure 13:
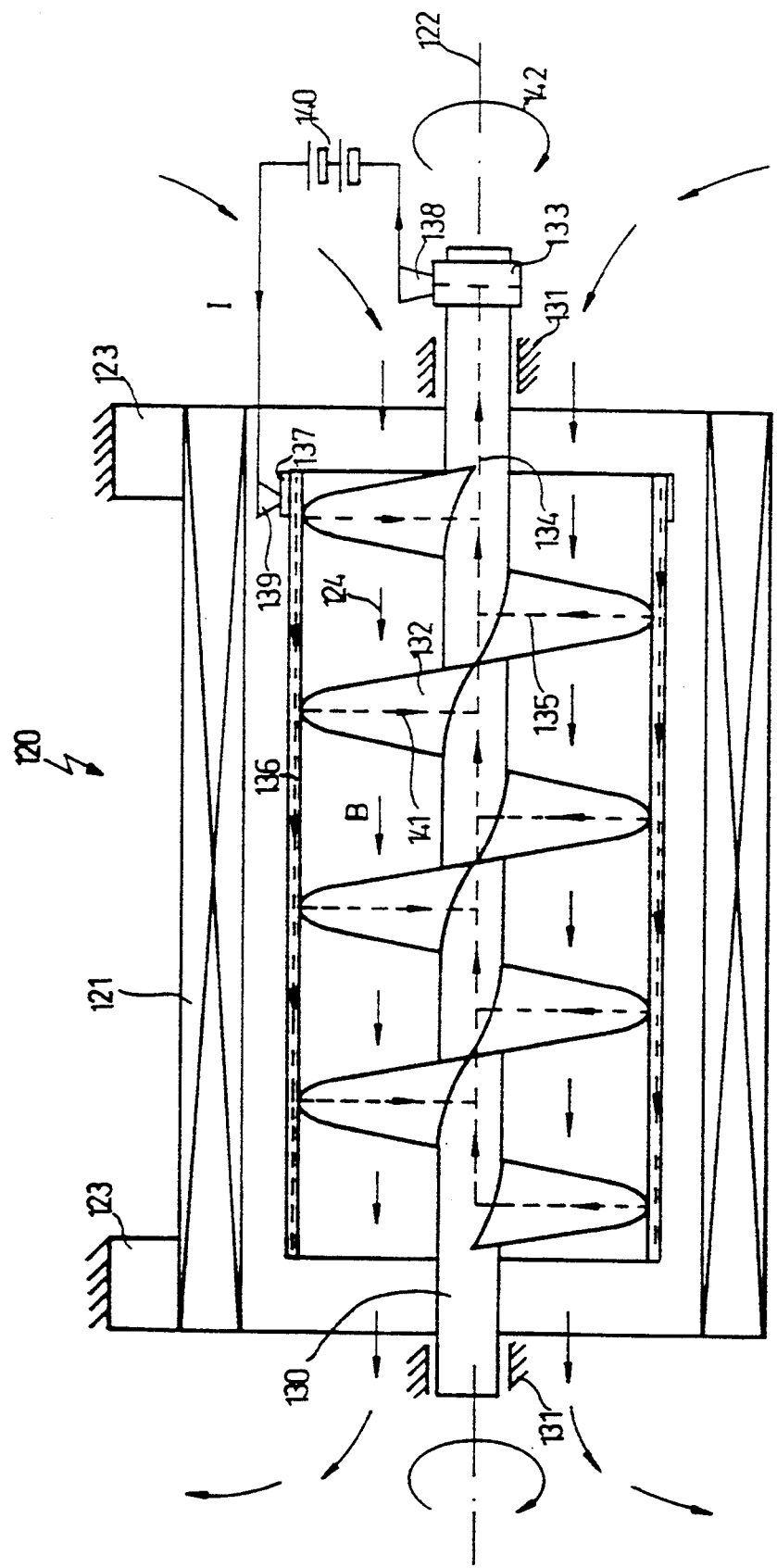
Figure 14:
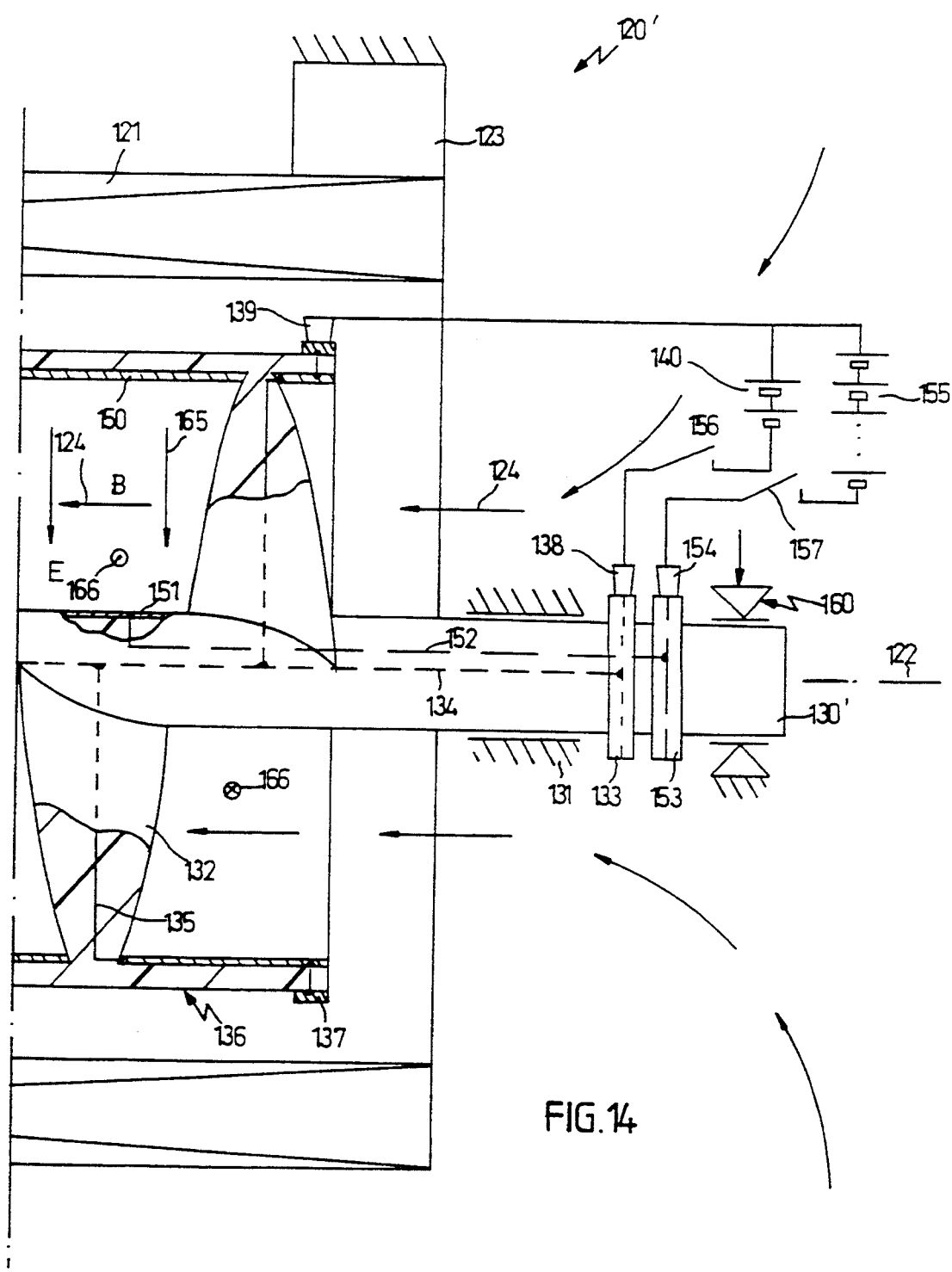
Figure 15:
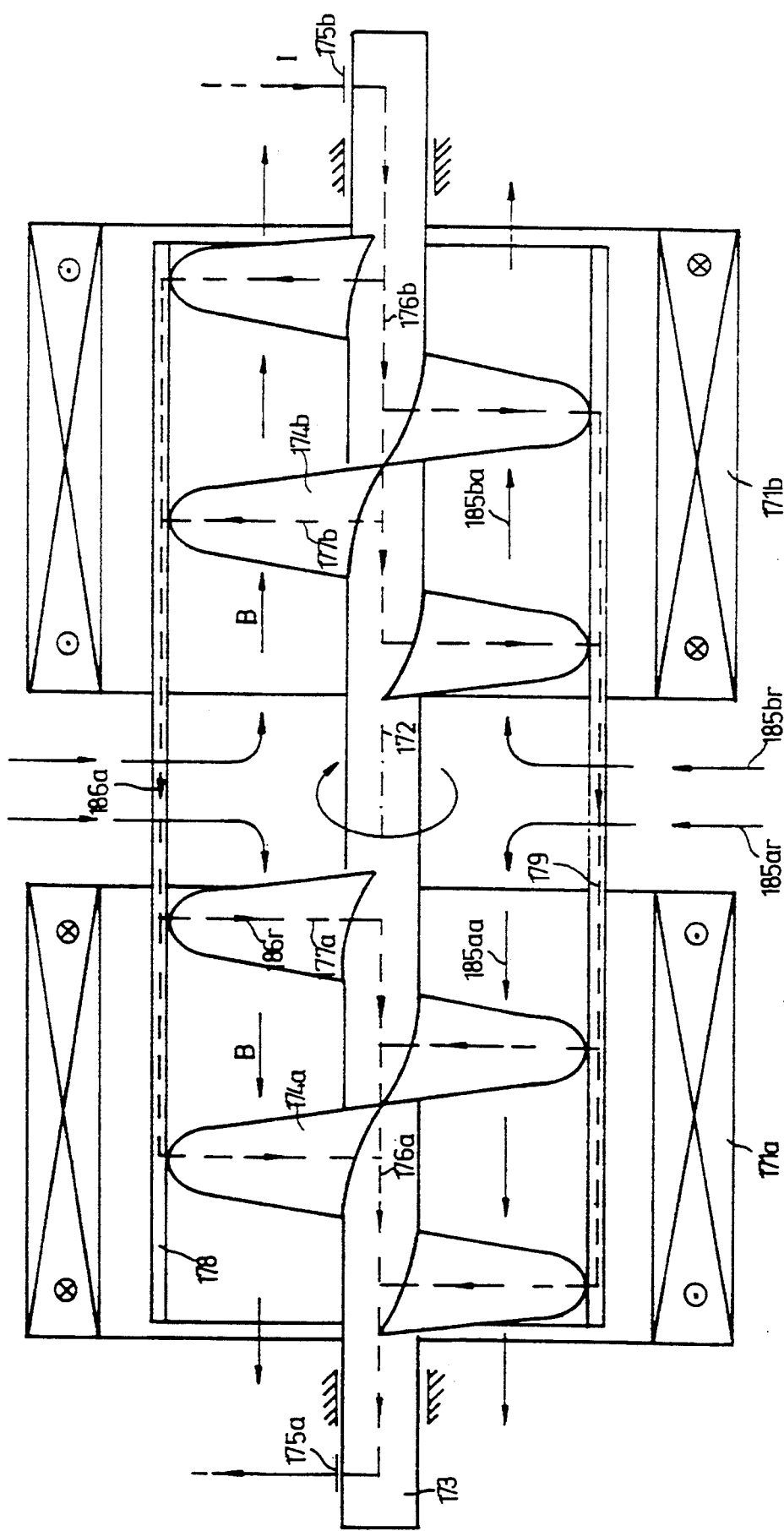

Embodiments of the invention are represented in the figures and will be further explained in the following description. Shown are:

FIG. 1 a perspective representation of a magnetic hydrodynamic propulsion unit for water vehicles according to prior art;

FIG. 2 a schematic representation to explain the effective Lorentz forces associated with the configuration of FIG. 1;

FIG. 3 a sectional view of an embodiment of a propulsion unit according to the invention;

FIG. 4 a representation similar to FIG. 3, however, for a tandem propulsion unit in accordance with the invention;

FIG. 5 through 8 schematic representations for the explanation of possibilities to configure propulsion units in accordance with the invention in for example ship hulls;

FIG. 9 a further schematic representation for the explanation of possible additional devices for propulsion elements in accordance with the invention;

FIG. 10 a similarly schematic view of a variation of a propulsion unit in accordance with the invention with an influencing of the effective electric field as a function of radial separation;

FIG. 11 a representation similar to FIG. 3 however even more simplified for a further embodiment of an apparatus according to the invention;

FIG. 12 a schematic view of a conductor through which current is flowing located in a magnetic field for the explanation of a unipolar propulsion;

FIG. 13 a schematic side view of a first embodiment of an apparatus according to the invention;

FIG. 14 an enlarged cross section from the representation of FIG. 13 however for a variation of a propulsion system according to the invention with additional operation possibilities as MHD-propulsion;

FIG. 15 a representation similar to FIG. 13 however for still another embodiment of the invention.

In FIG. 1, 10 indicates an entire magnetic hydrodynamic propulsion element for a water vehicle according to prior art.

The propulsion unit 10 includes a cryostat in which a pair of superconducting saddle coils 12 is arranged. The saddle coils 12 are arranged on both sides of a pipe 13 the opening entrance 14 of which is at room temperature and through which surrounding water, namely sea salt water, is streaming.

Two plate electrodes 15 which extend along the axial direction of the pipe 13 and exhibit a particular separation from each other are located in the opening entrance 14. The plate electrodes 15 are connected to a voltage source which is not shown in FIG. 1.

When the saddle coils 12 are excited they produce a magnetic field B the direction of which is labelled with an axis 16 in FIG. 1. On the other hand, the electrodes 15 produce an electric field E the axis of which is labelled with 17 in FIG. 1 and is perpendicular to axis 16 of the magnetic field B. Both axes 16, 17, for their part, are perpendicular to axis 18 of the pipe 13.

By examining FIG. 2 one notices the working mechanism of FIG. 1 as described in the following:

The surrounding water, i.e. the sea salt water, contains charge carriers 22, namely the salt water ions. The charge carriers 22 are also mobile in the water so that, through the action of an electric field E, the charge carriers 22 are caused to move since the electric field E exerts a force on the charge carriers 22 in the direction of the electric field E. The charge carriers 22 thereby assume a velocity v whose vector is directed in the direction of the electric field strength E.

Since, on the other hand, a magnetic field B is acting on the charge carriers 22 which is directed perpendicular to the electric field E, a so-called Lorentz force F is additionally exercised on the charge carriers 22 which corresponds to the cross product of the vectors of the velocity v and the magnetic field B and thereby, for its part, is directed perpendicular to both of the above mentioned quantities. This means that the Lorentz force F lies in the direction of the axis 18 of the pipe 13. In consequence of the plurality of charge carriers 22 in the salt water, a recoil force is exercised on the propulsion unit 10 as is indicated by an arrow 19 in FIG. 1. Since, for its part the propulsion unit 10 is freely movable it begins to move and, in fact, in a drive direction indicated with arrow 20 in FIG. 1 which is opposite to the recoil force 19 in the axis 18 of the pipe 13.

In the arrangement of FIG. 1, which is known in the art, it is necessary to arrange the pair of saddle coils 12 on both sides of the pipe 13 thereby necessitating a relatively complicated shape for the coils 12 and a likewise problematic support of these coils 12 on pipe 13. Furthermore, it can be clearly seen in the representation of FIG. 1 that the arrangement of the coils 12 results in a very large stray field since the coils 12 exhibit a very large opening window and, thereby, the field lines, to a large extent, close at a large distance outside of the propulsion unit 10. Finally the propulsion unit 10 necessitates a relatively large cryostat 11 in order to accommodate the saddle coils 12 with the surrounding pipe 13.

In contrast, FIG. 3 shows in a cross sectional representation, a propulsion unit 30 according to the invention. In the propulsion unit 30 a pipe 31 which is usually oriented in the direction of travel of the water vehicle is again provided for. In contrast to the configuration of FIG. 1 which is known in the art, the pipe 31 in the propulsion unit 30 according to the invention is surrounded by a solenoid coil 32, also preferentially a superconducting solenoid coil. The solenoid coil 32 encloses the pipe 31 essentially along its entire length.

An electrode 34 is centered at an axis 33 of the pipe 31. A voltage source 35 is switched between the electrode 34 and the electrically conducting pipe 31. In the embodiment of FIG. 3 the intermediate space between the electrode 34 and the pipe 31, is filled by a screw 36 which, preferentially, exhibits the shape of an Archimedes' spiral and, initially, should be considered to be rigidly connected to pipe 31.

When the voltage source 35, whose output voltage and polarity is adjustable, is switched on, an electric field, as in a cylindrical condensor, is formed between the electrode 34 and the pipe 31, as is indicated in FIG. 3 with the radial electrical field lines 37. In the application of FIG. 3, the electric field lines 37 are directed from the inside to the outside, i.e. from the electrode 34 to the pipe 31. Since, on the other hand, the magnetic field B is axially directed, as is indicated with magnetic field lines 41, the free charge carriers of the surrounding water, i.e. the sea salt water, acquire a Lorentz force, i.e. a current flow direction running circularly around the electrode 34 is imposed. This is indicated in FIG. 3 with current flow directions 38 into the plane of the drawing and 39 out of the plane of the drawing.

These circular current flow directions 38, 39 of the free charge carriers of the surrounding water are transformed via the rigid screw 36 into an axial recoil force 40 which is indicated in FIG. 3 with an arrow. The propulsion unit 40 in FIG. 3 moves, therefore, in the application case represented, towards the left, since the moving charge carriers impinge on the tilted flow surfaces of the screw 36 and thereby the circularly directed Lorentz force is transformed into the axially directed recoil force 40.

One clearly sees in FIG. 3 that the solenoid coil 32 which is used has a substantially simpler construction than the saddle coils 12 of prior art in accordance with FIG. 1, so that significantly more compact units can be constructed with which, for constant energy imput, higher field strengths can be achieved within the pipe 31. Moreover, the field rise at the location of the coil conductor in the solenoid coil 32 is significantly less than with the saddle coil 12 of FIG. 1 so that, when utilzing superconducting coils, the critical field strength values are first encountered at significantly higher current levels.

The solenoid coil 32 can be surrounded by a cylindrical iron shield casing 42. With the casing 42, magnetically sensitive devices on board of the water vehicle are protected; furthermore, the water vehicle is no longer as easy to detect using magnetic methods. This is particularly true also in contrast to the saddle coils 12 of prior art in accordance with FIG. 1 which are not, or only with great effort, shieldable with iron casings.

In the configuration in accordance with FIG. 3 the outward penetrating stray field is also substantially smaller, in particular, if a tandem configuration in accordance with FIG. 4 is utilized.

In this configuration a propulsion unit 50 is utilized which contains two propulsion units 30a, 30b of the same type as propulsion unit 30 of FIG. 3, upon a common frame 51.

The solenoid coils 32a, 32b of the propulsion units 30a, 30b are thereby so connected that the magnetic fields 52, 53 are directed in an axially opposing manner. This has the consequence that the magnetic field lines 41 close in upon themselves outside the solenoid coils 32a, 32b within a confined region, as can be clearly seen in FIG. 4. The stray field penetrating into the outer regions is, therefore, minimal in the configuration in accordance with FIG. 4.

Since the magnetic fields 52, 53 of the propulsion units 30a, 30b are directed oppositely to each other, it is necessary to take measures, in the regularly occurring case of a common forward drive, to achieve a common directioning of the recoil forces.

This can alternatively transpire in that either the direction of the electric field is switched and the pitch angle of the directing elements, i.e. the screw 36a, 36b is maintained as is shown in FIG. 4. As one notices in FIG. 4, the lower propulsion unit 30b completely corresponds to that of FIG. 3, whereas with the upper propulsion unit 30a, the direction of the electric field has been switched, as can be seen by contrasting the voltage source 35a and the electric field lines 37a to the elements 35b, 37b.

This makes it possible to keep the mechanical elements in particular the screws 36a and 36b respectively, identical which allows for economical fabrication.

In a variation which is not shown in the figures, it is, on the other hand, also possible to maintain the direction of the electric field while utilizing screws with oppositely directed pitches. This has, on the other hand, the advantage that the roll moments acting on the corresponding propulsion units 30a, 30b would be opposite to each other so that the frame 51 would be to this extent, compensated.

All together, thereby, with the configuration in accordance with FIG. 4, a leftward drive direction is effected as is indicated with arrow 55.

Thereby, clearly, as has been already mentioned, the voltage sources 55a, 55b can be in view of their output voltage and polarity adjustability, adjusted differently. In this manner, the propulsion unit 50 in accordance with FIG. 4 can be caused to deviate from a forward drive and maneuver by differently adjusting the voltage sources 35a, 35b with respect to their amplitude and/or polarity.

Furthermore another electrode pair 56 is represented in FIG. 4 at the left end (bow side) of the configuration which are arranged at a distance from another parallel to the plane of the drawing. The electrode pair 56 overlaps with the stray field 41 and likewise produces, for an appropriate applied voltage, a forward force in the drive direction, since the electric field lines produced by the electrode pair 56 are perpendicular to the plane of the drawing and, thereby, perpendicular to the magnetic field lines 41 of the stray field, which for their part, run perpendicular to the drive direction.

It is furthermore clear that the use of two propulsion units 30a, 30b in FIG. 4 is to be understood to be exemplary only. Over and above this, it is possible to also use even more propulsion units 30 whereby, preferentially, the total dipole moment of these units is equal to zero.

In FIG. 5 to FIG. 8 various variations showing how individual propulsion units or tandem propulsion units can be arranged in ship hulls of surface underwater vessels are represented.

Figure 5:
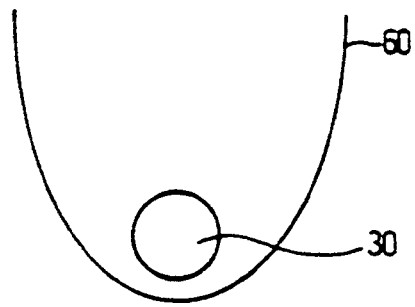

In the variation in accordance with FIG. 5 an individual propulsion unit 30 of the kind described in FIG. 3 is integrated into a ship's hull 60 such that a minimal current flow resistance is achieved.

Figure 6:
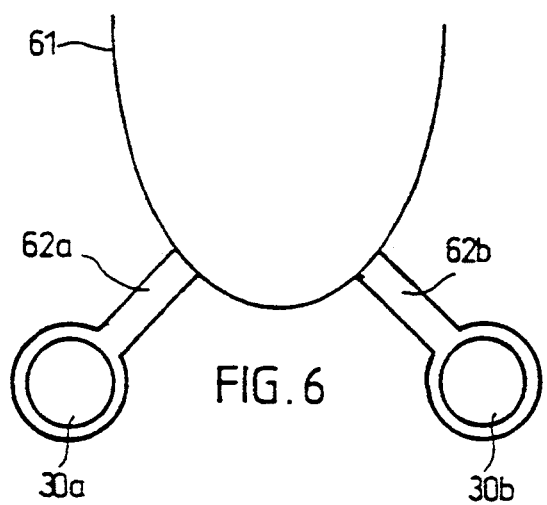

In the variation in accordance with FIG. 6, a tandem propulsion unit 30a, 30b is arranged on extensions 62a, 62b at a separation from a ship's hull 61.

Figure 7:
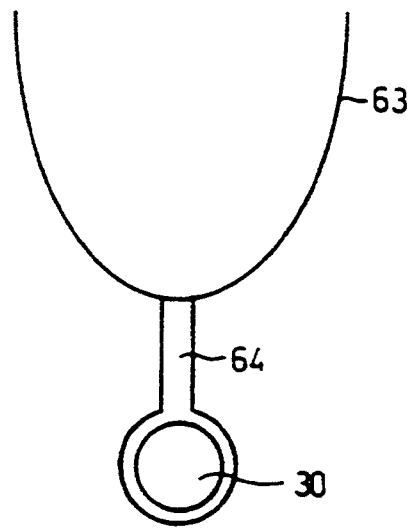

In the variation in accordance with FIG. 7, on the other hand, an individual propulsion unit 30 in accordance with FIG. 3 is located at the lower end of a keel 64 of a ship hull 63.

Figure 8:
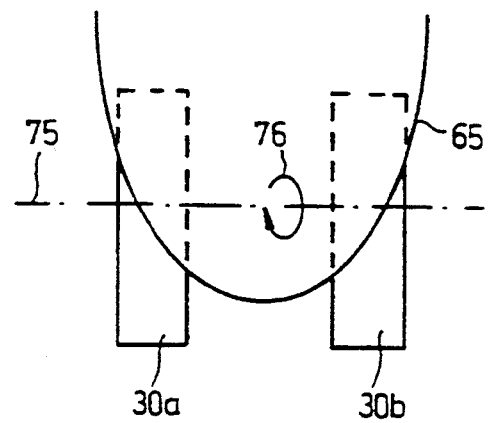

Finally, FIG. 8 illustrates the additional possibility of arranging a tandem propulsion unit 30a, 30b in a ship's hull 65 in such a way that the direction of the propulsion unit 30a, 30b does not run parallel to the drive direction but, rather, can be swivelled about an axis 75 perpendicular to the drive direction as indicated with arrow 76. In this manner, it is possible to maneuver underwater vehicles in the depth direction whereas, with surface vessels, a levitation of the ship hull can be achieved in order to reduce the hydrodynamic resistance, as is done with hydrofoils.

Herewith, clearly, the configuration of FIG. 5 to FIG. 8 can be applied in combination with another or through interchanging the individual elements, for example, in the case of FIG. 7, in that, at the lower end of the keel 64, a tandem unit 30a, 30b in the manner of FIG. 4 rather than a single propulsion unit 30 is utilized.

FIG. 9 shows another ship's hull 66 on the underside of which a propulsion unit 30 is arranged in the manner of FIG. 3, whereby, here, it is also clear that a tandem unit can be instituted.

An ionisation unit 67 is located in the ship's hull 66 in the front end of the propulsion unit 30 which, by means of a connector 68, is connected to the inner region of the pipe of the propulsion unit 30.

The ionisation unit 67 can, by way of example, be a supply container and dispenser for a substance with which it is possible to increase the conductivity of sea water, by way of example, a salt or a salt solution tank.

It is possible with the ionisation unit 67, via the connection 68, to increase the electrical conductivity of the surrounding water streaming through the pipe of the propulsion unit 30 for either temporary or for long term operation. In consequence of the increase of the ionisation concentration, the recoil force is also increased and, thereby, the drive velocity of the ship's hull 66.

In the right half of FIG. 9, a propulsion motor 69, by way of example an electric motor, a Diesel motor, in particular a close-circle Diesel motor, or their equivalent can be seen. The propulsion motor 69 is connected via a drive connection 70 to the electrode 34 which in this case is rotationally rigidly connected to the screw 36 and rotatably positioned within the pipe of the propulsion unit 30. In this manner it is possible to cause rotation of the electrode 34 with the screw 36 as is indicated with arrow 71.

If the rotation of the screw 36 acts opposite to the Lorentz force of the charge carriers of the surrounding water which is acting upon it, then the recoil force is increased and, thereby, the drive velocity of the ship's hull 66 be it in temporary or in long term operation.

It is known in the art that, with cylindrical condensors the electrical field strength decreases radially outwards from the electrode located at the cylinder axis with the inverse value of the radius. This has the consequence that the Lorentz forces acting on the charge carriers of the surrounding water also decrease since, along with the electric field strength, the velocity of the charge carriers also decreases and, in fact, with the inverse of the square of the radius.

Since this, in certain cases, can lead to turbulence or cavitations, provision is made in the embodiment of FIG. 10 for compensation of this radial dependence or for its optimization.

This is accomplished in the embodiment of FIG. 10 in that the radial region between the electrode 34 and the pipe 31 is subdivided into many cylindrical sections. Towards this end, two concentric pipes 31', 31" are provided for which are located at radial separations $r_2$ or $r_3$ from the electrode 34 whereby $r_2$ and $r_3$ are smaller than the radial separation $r_1$ of the pipe 31 from the electrode 34.

If one then connects the pipes 31, 31' and 31" to the taps of the voltage source 35, a linearized distribution of the electrical voltages as a function of the radius r occurs, whereby this distribution can be made increasingly linear with finer step sizes between the pipes 31, 31', 31". It is also possible to connect the connecting cables 80 from the pipes 31, 31', 31" to the voltage source 35 in a non-linear fashion so that the distribution is even more optimized, e.g. in order to achieve a radially independent constant angular acceleration.

Alternatively or in addition, it is also obviously possible to vary the pitch angle of the screw 36 as a function of the radius and/or along the axis in such a way that the decrease in field strength toward the outside is optimally instituted while taking into consideration the force and/or flow profile.

FIG. 11 shows a further variation of a propulsion unit 30' which is largely similar to that of FIG. 3; and there are corresponding elements provided for using the same reference symbols with the addition of an apostrophy.

The propulsion unit 30' of FIG. 11 is located, by way of example, underneath a ship's hull 45 on an extension 86 or keel. It can, however, also be positioned on the ship's hull in other ways as was already explained further above using many examples.

If one takes the arrow 87 in FIG. 11 as the drive direction, then, at the left end of the pipe 31' in FIG. 11, 88 labels the in-flowing water whereas 89, at the right end of the pipe 31', labels the out-streaming water.

As one can clearly see in FIG. 11, the pipe 31' increases in cross section in going from water entrance to water exit, and therefore is, by way of example, formed in the shape of a cone, a rotational paraboloid, or a rotational hyperbola.

Furthermore, side intake openings 90 in pipe 31' can also be provided for through which, in the fashion of a water jet pump, additional water can be sucked into the pipe 31' as indicated by arrows 91.

The cross sectional increase in pipe 31' or the sideward intake of additional water has the following purpose:

If, as represented in FIG. 3, a continuous pipe with constant cross section is used, then a steady Lorentz force is exercised in the water which is streaming through along the axial length so that, with a compressible medium, the exiting medium would be accelerated relative to the entering medium. Since, as is known in the art, water is an incompressible medium, the sucktion is increased through the axial region of application of the Lorentz forces and, as a consequence, it is possible that eddy currents and cavitation manifestations arise. This is mitigated against, according to the embodiment of FIG. 11, in that "fresh" water is sucked in from the side and, concurrently, an increasing cross section is provided for so that a compressible medium is, so to say, simulated. In this manner, the outward flowing velocity of the water 89 can altogether be regulated to be the same size as the entering velocity of the water at 88, whereby, however, in consequence of the enlarged cross section of the pipe 31' at the exit end and in consequence of the sideward in take opening 90, the exiting amount of water per unit time is increased.

Finally, also depicted in FIG. 11 with 95 and 96 is that, at the pipe entrance and at the pipe exit, deflecting directing sheets can be provided for in order to achieve a laminar axial flow-in or flow-out respectively of the water and to prevent the circular streaming in pipe 31' from perpetuating through to the outer region of the pipe 31'.

In a practical embodiment of the propulsion unit in accordance with the invention the propulsion unit 30 in accordance with FIG. 3 can, by way of example, be so arranged that the pipe 31 obtains a diameter of 1 m and a length of 10 m. The electrode 34 can have a diameter of 0.2 m and between electrode 34 and pipe 31 an Archimedes' screw 36 can be incorporated.

For solenoid coil 32, a coil with, by way of example, 3 to 4 T magnet field strength can be used is e.g. known in the art of magnetic resonance imaging. These types of solenoid coils have the further advantage that the field increase at the location of the windings of the coil itself can be kept to as small a value as possible (in contrast to the case of saddle coils of the kind depicted in FIG. 1) so that higher field strengths can be achieved with smaller magnetic coils. Field lines of a magnetic field B are labelled in FIG. 12 with 110. The magnetic field lines 110 run parallel to another in a given direction.

An electrical conductor 111 through which a constant current I is flowing, is arranged perpendicular to the magnetic field lines 110. The electrical conductor 111 is borne in a rotateable fashion in a direction perpendicular to its extension in the bearings indicated with 112.

Since, as mentioned, the conductor 111 is directed perpendicular to the magnetic field lines 110 and has current flowing through it, said conductor, in consequence of the established Lorentz force is deflected perpendicularly to its extension and perpendicularly to the magnetic field lines 110 so that it describes a rotational motion around an axis 114 defined by the bearing 112 which is directed parallel to the magnetic field lines 110.

A rotational moment can be extracted from the rotational motion of the electrical conductor 111 about the axis 114 and utilized for propulsion purposes.

In FIG. 13 120 labels a propulsion unit for water vehicles in its entirety.

A solenoid coil 121 is arranged rotationally symmetric about an axis 122. The solenoid coil 121 can be a resistive i.e. normally conducting coil as well as a superconducting coil further details of which are not represented in the Fig. for reasons of clarity.

The solenoid coil 121 is arranged at an outer side of a water vehicle so that its inner region is filled with surrounding water.

123 indicates a spatially fixed support for the solenoid coil 121 at the ship's hull in order to clarify that the solenoid coil 121 is non-rotatable.

124 labels the field lines of the magnetic field B produced by the solenoid coil 121. The field lines 124 run inside the solenoid coil 121 in a predominantly axial direction and are first deflected into a radial direction in the outer region of the solenoid coil 121 as is, in and of itself, known in the art.

A shaft 130 extends coaxially to the solenoid coil 121 along the axis 122. The shaft 130 is borne in a rotatable fashion in the spatially fixed bearings 131. It supports a propeller 132 which, in the embodiment represented is a multi-stage Archimedes' spiral.

At the right end of FIG. 13, the shaft 130 supports a first slip ring 133 which is connected to a first electrical conductor 134. The first electrical conductor 134 penetrates the axis 130 in an axial direction. Bridge conductors 135 travel radially from the first electrical conductor 134 and extend through the blades of the propeller 132.

The free ends of the propeller 132 blades are surrounded by a cylindrical pipe 136 which is rotationally rigidly connected to the propeller 132 and thereby also to the shaft 130.

The pipe 136 is electrically conducting in an axial direction in that either axially running electrical conductors are installed, as is the case with the first electrical conductor 134 in the shaft 130, or in that the pipe 136 is partially or completely conducting.

In the configuration which is explained above, it is solely important that the blades of the propeller 132 have current flowing through them in a radial direction, whereas the conduction of electrical current in the axial direction through the shaft 130 and through the pipe 136 can be realized in various ways.

A second slip ring 137 is located on pipe 136. An electrical contact to the slip rings 133 or 137 respectively is realized with brushes 138 or 139 respectively. The brushes 138, 139 are connected to a first voltage source 140.

In this manner, as indicated with arrow 141, the radial bridge conductors 135 have current flowing through them and, in fact, with the plurality which is indicated, all of them from outside radially towards the inside. On the other hand the fact that the magnetic field lines 124 in FIG. 13 are directed from the right towards the left means that, as a reference to the representation of the principle of operation depicted in FIG. 12 shows, the shaft 130 acquires a rotational moment in the clockwise direction as viewed from the left side of FIG. 13.

In this manner the propeller 132 is rotated and the propulsion unit 120 develops a recoil force.

FIG. 14 shows the right front end of a propulsion unit 120' which is configured similarly to the propulsion unit 120 in accordance with FIG. 13 and, therefore, the same elements are provided with the same reference symbols.

As one notices in FIG. 14 the pipe 136 is provided with a first conducting coating 150 on its inner cylindrical surface, whereas the shaft 130' bears a second conducting coating 151 on its outer cylindrical surface. Thereby, clearly, the pipe 136' or the shaft 130' respectively can also be configured as completely conducting, e.g. metallic.

A second electrical conductor 152 extends in an axial direction through the shaft 130' and is, on the one hand, connected to the second conducting surface 151 and, on the other hand, to a third slip ring 153. The contact to the third slip ring 153 is established by means of a third brush 154.

A second voltage source 155 is switched in between the third brush 154 and the second brush 139 which, for their part, are galvanically connected to the first conducting surface 150.

While the first voltage source 150 is so configured that a high current I (compare FIG. 13) flows through the radial bridge conductors 135, the second voltage source 155 is so configured that a high voltage is established between the conducting surfaces 150, 151. In this manner, a radially directed electric field is established, the field lines of which 165 extend in a radial direction between the conducting surfaces 150, 151.

By means of switches 156, 157 it is possible, on the one hand, to switch in the first voltage source 150 and, on the other hand, the second voltage source 155 in their respective current circuits.

When the first switch 156 is closed a direct current only flows through the radial bridge conductors 135 in the manner already explained and the propulsion unit 120' works in a manner of a unipolar motor as was already explained in FIG. 13.

It is however alternatively possible to switch over to a MHD propulsion.

Toward this end a locking brake 160 is initially applied with which the shaft 130' is held spatially fixed, i.e. can be connected to the solenoid coil 121 in a rotationally rigid fashion. Then, when the first switch 156 is opened, the second switch 157 is closed. A large constant voltage then exists between the conducting coatings 150, 151 and the electric field E is constructed with the field lines 165.

Since the field lines 124 of the magnetic field B and the field lines 125 of the electric field E are perpendicular to each other and in fact in the axial or in the radial directions respectively, the ions of the surrounding salt water experience a Lorentz force which is directed circularly around the axis 122. This is indicated with 166 and one sees that the surrounding water runs in the clockwise direction when observed from the left in FIG. 14.

Since the blades of the propeller 132 are provided with directing surfaces which are pitched relative to the axis 122, the water, with its circular path, is concurrently deflected in the axial direction and thereby also exerts a recoil force on the propulsion unit 120'.

In the embodiment shown in FIG. 15 a propulsion unit 170 exhibits two solenoid coils 171a, 171b which are arranged coaxially to an axis 172, however, adjacent to and at an axial separation from each other.

The solenoid coils 171a, 171b are penetrated by a common shaft 173 which, for its part, bears a propeller. In this manner, a propeller section 174a is located within the solenoid coil 171a and a further propeller section 174b is located within the solenoid coil 171b.

By means of the slip contacts 175a, 175b, an electrical connection to shaft 173 can be established at its two free ends.

Axial electrically conducting pieces 176a or 176b respectively run within the shaft 173 each in respective solenoid coil regions 171a, 171b. On the other hand, radial bridge conductors 177a or 177b respectively branch off from the axial electric conductor 176a, 176b said bridge conductors radially penetrate propeller section blades 174a, 174b.

The radial bridge conductors 177a, 177b then run axially in a pipe 178 which, for its part, surrounds the propeller sections 174a, 174b and which also is rotationally rigidly connected to both the propeller sections 174a, 174b as well as the shaft 173.

The axially running conducting sections of pipe 178 are labelled with 179.

The solenoid coils 171a, 171b have current flowing through them in opposite directions so that they produce oppositely directed magnetic fields B. Labelled with 185aa are the axially directed magnetic field lines of the solenoid coil 171a and with 185ba the corresponding oppositely directed axially running magnetic field lines of the solenoid coil 171b. In a corresponding fashion 185ar and 185br label the radially extending magnetic field lines of the solenoid coils 171a and 171b respectively whereby one should notice that these travel radially in the same direction.

In the configuration drawn in FIG. 15, a constant current I is supplied by means of the right slip contact 175b into the axially running electrical conductor 176b. The current divides itself from there into the radial bridge conductors 177b and then flows through the axially running electrical conductors 179 along the pipe 178 before returning back to the radial bridge conductors 177a and then joining together in the axially directed electrical connectors 176 within the left solenoid coil 171a and exiting via the left slip contact 175a.

In the region of the blades of the propeller section 174a, 174b the same effect as was already described in detail with FIG. 13 establishes itself. 186r labels the radially running current I and one easily sees that the relationships within the solenoid coil 171a, 171b are in corresponding two-fold opposition to each other so that a common rotational direction for the shaft 173 consequently results.

The current I streaming in the axial direction 186a encounters field lines 185ar and 185br respectively in the axial intermediate space between solenoid coil 171a and 171b which are at right angles to the current flow direction so that, there as well, a force in the circumference direction is exercised upon the electrical connection 179. The configuration is here also so arranged that the same rotational directions is imparted to the shaft 173.

In this manner, in the propulsion unit 170 of FIG. 15, both the axially directed magnetic field as well as the radially directed magnetic field are taken advantage of. Clearly, the configuration of FIG. 15 can be multiply repeated in the axial direction using short solenoids.

Clearly, in this connection, configurations of embodiments of the invention can also be chosen with which only the radially directed field lines are used and, obviously, with the configuration of FIG. 15 both radially directed field lines which extend from the left and the right of the propulsion unit 170 into the outer region can also be taken advantage of.

The outer casing surrounding the propeller can be completely closed. Likewise the solenoid coils 171a and 171b can be rigidly connected to each other possibly by means of a common support pipe. In particular, superconducting solenoids can be located within a common cryostat on a coil supporter so that mechanical forces between the solenoids can be safely contained.

We claim:

1. A water vehicle, comprising:
a hull;
an open-ended pipe connected to said hull and positioned to be immersed in water surrounding said vehicle, said pipe defining a longitudinal axis;
a solenoid magnet coil arranged around said pipe in an essentially coaxial relationship for generating an axially oriented magnetic field therein;
a first electrode extending essentially along said longitudinal axis;
a second electrode having essentially cylindrical shape and extending coaxially to said first electrode with a cylindrical gap formed therebetween;
a voltage source arranged to be switched between said first and second electrodes for generating an electrical field therebetween, said electrical field being directed in a radial direction; and
hydrodynamic vane means arranged within said cylindrical gap and inclined relative to a radial plane under a pitch angle with respect to said longitudinal axis for deflecting circularly flowing water into an axial direction.

2. The water vehicle of claim 1, wherein said pipe is designed as said second electrode.

3. The water vehicle of claim 1, wherein ionization means are connected with said pipe.

4. The water vehicle of claim 3, wherein said ionization means are designed for introducing a substance into said surrounding water for increasing its electrical conductivity.

5. The apparatus of claim 1, wherein two propulsion units configured from said solenoid magnet coil and said pipe are arranged upon a common frame parallel to each other, with magnetic fields produced from said solenoid coils being directed oppositely to each other, said hydrodynamic vane means being pitched in a common direction and said electrical fields being directed oppositely to each other for making the total magnetic dipole moment thereof essentially zero.

6. The apparatus of claim 1, wherein two propulsion units configured from said solenoid magnet coil and said pipe are arranged upon a common frame parallel to each other, with magnetic fields produced from said solenoid coils being directed oppositely to each other, said hydrodynamic vane means being pitched oppositely to each other and said electrical fields being directed in a common direction.

7. A water vehicle, comprising:
a hull;
an open-ended pipe connected to said hull and positioned to be immersed in water surrounding said vehicle, said pipe defining a longitudinal axis;
a solenoid magnet coil arranged around said pipe in an essentially coaxial relationship for generating an axially oriented magnetic field therein;
a first electrode extending essentially along said longitudinal axis;
a second electrode having essentially cylindrical shape and extending coaxially to said first electrode with a cylindrical gap formed therebetween;
a voltage source arranged to be switched between said first and second electrodes for generating an electrical field therebetween, said electrical field being directed in a radial direction;
hydrodynamic vane means arranged within said cylindrical gap and inclined relative to a radial plane under a pitch angle with respect to said longitudinal axis for deflecting circularly flowing water into an axial direction;
bearing means for rotatably journalling said hydrodynamic vane means within said pipe; and
a propulsion motor for driving said hydrodynamic vane means.

8. A water vehicle, comprising:
a hull;
an open-ended pipe connected to said hull and positioned to be immersed in water surrounding said vehicle, said pipe defining a longitudinal axis;
a solenoid magnet coil arranged around said pipe in an essentially coaxial relationship for generating an axially oriented magnetic field therein;
a first electrode extending essentially along said longitudinal axis;
a second electrode having essentially cylindrical shape and extending coaxially to said first electrode with a cylindrical gap formed therebetween;
further electrodes arranged in a stray field generated by said magnet coil;
a voltage source arranged to be switched between said first electrode and said second electrode, and between said first electrode and said further electrodes for generating an electrical field therebetween, said electrical field being directed in a radial direction; and
hydrodynamic vane means arranged within said cylindrical gap and inclined relative to a radial plane under a pitch angle with respect to said longitudinal axis for deflecting circularly flowing water into an axial direction.

9. A water vehicle, comprising:
a hull;
an open-ended pipe connected to said hull and positioned to be immersed in water surrounding said vehicle, said pipe defining a longitudinal axis, said pipe, further, having a cross-section enlarging in a direction of flow of said water along said pipe;
a solenoid magnet coil arranged around said pipe in an essentially coaxial relationship for generating an axially oriented magnetic field therein;
a first electrode extending essentially along said longitudinal axis;
a second electrode having essentially cylindrical shape and extending coaxially to said first electrode with a cylindrical gap formed therebetween;
a voltage source arranged to be switched between said first and said second electrodes for generating an electrical field therebetween, said electrical field being directed in a radial direction; and
hydrodynamic vane means arranged within said cylindrical gap and inclined relative to a radial plane under a pitch angle with respect to said longitudinal axis for deflecting circularly flowing water into an axial direction.

10. The water vehicle of claim 9, wherein said pipe is provided with a side intake opening.

11. A water vehicle, comprising:
a hull;
an open-ended pipe connected to said hull and positioned to be immersed in water surrounding said vehicle, said pipe defining a longitudinal axis;
a solenoid magnet coil arranged around said pipe in an essentially coaxial relationship for generating an axially oriented magnetic field therein;
a first electrode extending essentially along said longitudinal axis;
a second electrode having essentially cylindrical shape and extending coaxially to said first electrode with a cylindrical gap formed therebetween;
a voltage source arranged to be switched between said first and said second electrodes for generating an electrical field therebetween, said electrical field being directed in a radial direction;
hydrodynamic vane means arranged within said cylindrical gap and inclined relative to a radial plane under a pitch angle with respect to said longitudinal axis for deflecting circularly flowing water into an axial direction; and
wherein a propulsion unit, configured from said solenoid magnet coil and said pipe, is rotatably disposed at an angle with respect to a ship hull's longitudinal axis such that said propulsion unit may be swivelled by varying said angle.

12. A water vehicle, comprising:
a hull;
an open-ended pipe connected to said hull and positioned to be immersed in water surrounding said vehicle, said pipe defining a longitudinal axis;
a magnet coil arranged around said pipe for generating a magnetic field therein, said magnetic field having a first direction in a predetermined spatial area within said pipe;
hydrodynamic vane means arranged within said pipe and inclined under a pitch angle relative to a radial plane with respect to said longitudinal axis;
bearing means for allowing said hydrodynamic vane means to rotate within said pipe;
an electrical conductor rigidly connected to said hydrodynamic vane means and extending through said predetermined spatial area within said pipe in a second direction perpendicular to said first direction; and a current source arranged to be connected to said electrical conductor for conducting electrical current therethrough.

13. The water vehicle of claim 12, wherein said magnet coil is a solenoid magnet coil arranged around said pipe in an essentially coaxial relationship for generating an axially oriented magnetic field therein, the apparatus further comprising:
a first electrode extending essentially along said longitudinal axis;
a second electrode having essentially cylindrical shape and extending coaxially to said first electrode with a cylindrical gap formed therebetween; and
a voltage source arranged to be switched between said first and said second electrodes for generating an electrical field therebetween, said electrical field being directed in a radial direction.

14. The apparatus of claim 13, wherein two propulsion units configured from said solenoid magnet coil and said pipe are arranged upon a common frame parallel to each other, with magnetic fields produced from said solenoid coils being directed oppositely to each other, said hydrodynamic vane means being pitched in a common direction and said electrical fields being directed oppositely to each other for making the total magnetic dipole moment thereof essentially zero.

15. The apparatus of claim 13, wherein two propulsion units configured from said solenoid magnet coil and said pipe are arranged upon a common frame parallel to each other, with magnetic fields produced from said solenoid coils being directed oppositely to each other, said hydrodynamic vane means being pitched oppositely to each other and said electrical fields being directed in a common direction.

16. A water vehicle, comprising:
a hull;
an open-ended pipe connected to said hull and positioned to be immersed in water surrounding said vehicle, said pipe defining a longitudinal axis;
a magnet coil arranged around said pipe for generating a magnetic field therein, said magnetic field having a first direction in a predetermined spatial area within said pipe, said magnet coil having two solenoid magnet coils arranged along a common axis and axially separated from each other;
hydrodynamic vane means arranged within said pipe and inclined under a pitch angle relative to a radial plane with respect to said longitudinal axis;
bearing means for allowing skid hydrodynamic vane means to rotate within said pipe;
an electrical conductor rigidly connected to said hydrodynamic vane means and extending through said predetermined spatial area within said pipe in a second direction perpendicular to said first direction, said conductor extending in an axial direction in an axial gap between said solenoid magnet coils; and
a current source arranged to be connected to said electrical conductor for conducting electrical current therethrough.

17. A water vehicle, comprising:
a hull;
an open-ended pipe connected to said hull and positioned to be immersed in water surrounding said vehicle, said pipe defining a longitudinal axis;
a magnet coil arranged around said pipe for generating a magnetic field therein, said magnetic field having a first direction in a predetermined spatial area within said pipe;
hydrodynamic vane means arranged within said pipe and inclined under a pitch angle relative to a radial plane with respect to said longitudinal axis;
bearing means for allowing said hydrodynamic vane means to rotate within said pipe;
an electrical conductor rigidly connected to said hydrodynamic vane means and extending through said predetermined spatial area within said pipe in a second direction perpendicular to said first direction;
a current source arranged to be connected to said electrical conductor for conducting electrical current therethrough; and
wherein a propulsion unit, configured from said magnet coil and said pipe, is rotatably disposed at an angle with respect to said ship hull's longitudinal axis, such that said propulsion unit may be swivelled by varying said angle.

* * * * *